United States Patent
Jain (10) Patent No.: US 12,438,699 B2
(45) Date of Patent: Oct. 7, 2025

(54) ENCRYPT SHARED DATA WITH AN AGGREGATE KEY DERIVED FROM MULTIPLE CRYPTO KEYCHAINS

(71) Applicant: SAP SE, Walldorf (DE)

(72) Inventor: Sunil Jain, Portland, OR (US)

(73) Assignee: SAP SE, Walldorf (DE)

( * ) Notice: Subject to any disclaimer, the term of this patent is extended or adjusted under 35 U.S.C. 154(b) by 228 days.

(21) Appl. No.: 18/188,768

(22) Filed: Mar. 23, 2023

(65) Prior Publication Data

US 2024/0322998 A1  Sep. 26, 2024

(51) Int. Cl.
*H04L 9/08* (2006.01)
*H04L 9/32* (2006.01)

(52) U.S. Cl.
CPC .......... *H04L 9/0822* (2013.01); *H04L 9/3226* (2013.01)

(58) Field of Classification Search
CPC ... H04L 9/0822; H04L 9/3226; H04L 9/0861; H04L 9/088; H04L 9/0891
See application file for complete search history.

(56) References Cited

U.S. PATENT DOCUMENTS

| | | | |
|---|---|---|---|
| 9,306,741 B1 * | 4/2016 | Brainard | H04L 9/0861 |
| 10,116,440 B1 * | 10/2018 | Rudzitis | H04L 9/0891 |
| 10,164,955 B1 * | 12/2018 | Halcrow | G06F 3/0623 |
| 2015/0113276 A1 * | 4/2015 | Day | H04L 9/0819 713/171 |
| 2022/0005039 A1 * | 1/2022 | Hires | G06Q 20/4014 |
| 2024/0243900 A1 * | 7/2024 | Skvortso | H04L 9/3221 |

OTHER PUBLICATIONS

Ogburn et al., "Homomorphic Encryption", ScienceDirect, 2013 (Year: 2013).*
Microsoft, "Concatenate function", Jan. 15, 2021 (Year: 2021).*
Superuser, "Concatenate Multiple Cells with different data types", Oct. 25, 2017 (Year: 2017).*
Codecademy Forums, "How to use "typeof" when concatenating two data types?", Jul. 2019 (Year: 2019).*
Api.sap.com [online], "Central Key Management Service (KMS)" Jul. 2021, retrieved on Mar. 14, 2023, retrieved from URL <https://api.sap.com/api/CentralKeyManagement/resource>, 2 pages.
Boneh et al., "Aggregate and verifiably encrypted signatures from bilinear maps." Advances in Cryptology—EUROCRYPT 2003: International Conference on the Theory and Applications of Cryptographic Techniques, Warsaw, Poland, Proceedings 22, Springer Berlin Heidelberg, May 4-8, 2003, 24 pages.
US Department of Commerce, "800-57 Part 2, Recommendation for Key Management: Part 2—Best Practices for Key Management Organizations" National Institute of Standards and Technology Special Publication, Revision 1, May 2019, 91 pages.

* cited by examiner

*Primary Examiner* — Henry Tsang
(74) *Attorney, Agent, or Firm* — Fish & Richardson P.C.

(57) ABSTRACT

In an implementation, all individual data owner key encryption keys (KEKs) are concatenated, as a concatenated key, to form a single longer key. A key derivative function (KDF) is applied to the concatenated key to derive an aggregateKey of a certain target property. Policy-as-code is applied to verify a current validity/authority of the aggregateKey on data of an individual data owner to allow any operations on the data of an individual data owner.

20 Claims, 3 Drawing Sheets

ENCRYPT SHARED DATA WITH AN AGGREGATE KEY DERIVED FROM MULTIPLE CRYPTO KEYCHAINS

BACKGROUND

Routine industry practice is for software services and applications to process and store shared data which belongs to multiple data owners. To regulate value extraction from the shared data, and to mandate isolation and encryption of individuals' data, a variety of data protection and privacy laws as well as cybersecurity standards are emerging worldwide. As a result, entities are increasingly offering "customer-managed-keys" capability in their applications or services, which provides some assurance that data owners can control their encryption keys used to encrypt their data. However, when it comes to shared data, it becomes difficult for an application or service to decide which individual owner's key to use. Cryptographic fidelity of keys used for shared data encryption is often compromised.

SUMMARY

The present disclosure describes encrypting shared data with an aggregate key derived from multiple crypto keychains.

In an implementation, a computer-implemented method, comprises: concatenating, as a concatenated key, all individual data owner key encryption keys (KEKs) to form a single longer key; applying, to the concatenated key, a key derivative function (KDF) to derive an aggregateKey of a certain target property; and applying policy-as-code to verify a current validity/authority of the aggregateKey on data of an individual data owner to allow any operations on the data of an individual data owner.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, cryptographic integrity of customer specific keychains is maintained while ensuring specific customer's data cannot be decrypted by the application/service sharing multi-customer data. Second, end-to-end cryptographic fidelity and traceability are provable by key-logs. Third, the described approach provides reduced latencies and easier operational complexities of encryption for applications operating on multi-customer data. Fourth, the described approach provides for reduced costs of data-at-rest deployment models (for example, fine grain sharing of data bases through schema level encryption).

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes encrypting shared data with an aggregate key derived from multiple crypto keychains, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Routine industry practice is for software services and applications to process and store shared data which belongs to multiple data owners, requiring isolation and encryption per individual owner of the data. To regulate value extraction from the shared data, and to mandate isolation and encryption of individuals' data, a variety of data protection and privacy laws as well as cybersecurity standards are emerging worldwide.

As a result, data sharing services are increasingly offering customer-managed-keys (CMK) capability in their applications or services, which provides some assurance that data owners can control their encryption keys used to encrypt their data. This offered capability implicitly suggests that, for example, a data owner A's encryption keys will not be used to encrypt a data owner B's data.

This concept works if an individual's data is isolated, because their respective key can be used to encrypt their particular data. However, when it comes to shared data, it becomes difficult for an application or service to decide which individual owner's key to use.

In shared data scenarios, services and applications typically either do not use encryption at all or use completely unrelated encryption keys (to data owners) to encrypt data. This breaks cryptographic fidelity and traceability of individual keychains, and can led to legal/regulatory compliance violations. In fact, it is an industry-wide problem that most data sharing services disclaim cryptographic fidelity of keys used for shared data encryption in shared data encryption scenarios.

A theoretical solution is an elaborately implemented public-private key workflow combined with fine-grain data isolation schema used to ensure data owner A's keys would not be used to encrypt data owner B's data. This would be a prohibitively expensive solution from both cost and performance measures.

This disclosure describes a solution to the problem of encrypting data in shared data scenarios with an aggregate key derived from multiple crypto keychains. The solution can be implemented in multi-tenant and embedded service/application scenarios, in a low-cost practical-scalable manner, and does not require any elaborate public-private key workflows. The algorithm is modular and can be implemented as a light-weight, seamless, embedded microservice.

The solution exploits mathematics of a proven aggregation theorem for signatures to combine encryption keys belonging to multiple data owners into an aggregate key (or "aggregateKey"). The aggregateKey is a verifiable cryptographic representative of various data owners' keys, and can be used to encrypt their shared data while maintaining cryptographic traceability and integrity to each individual data/key owner.

Figure 2:
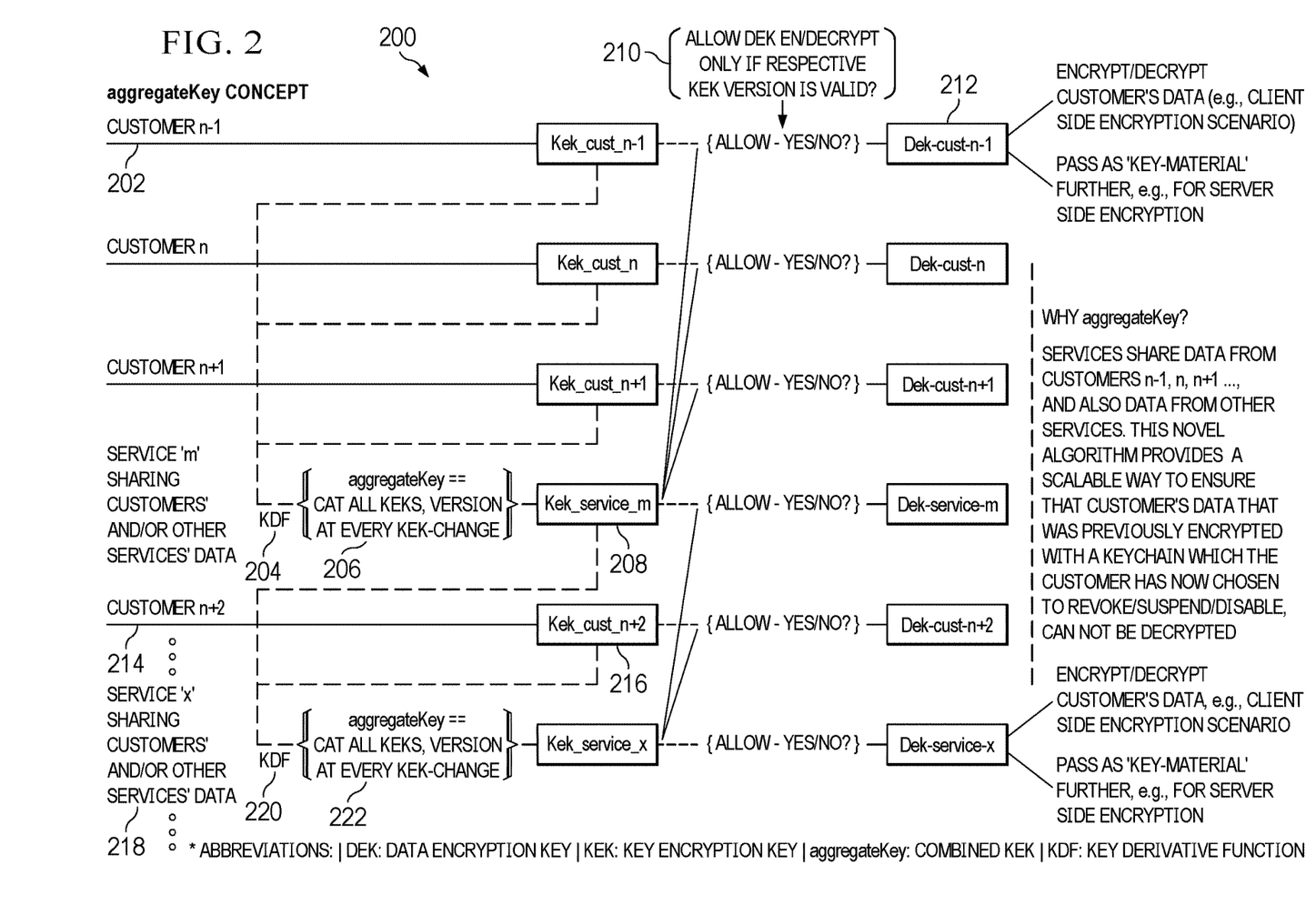
FIG. 2 is a logic diagram illustrating the computer-implemented method of FIG. 1, according to an implementation of the present disclosure.

The described approach ensures that if any data/key owner decides to revoke their specific key at any point in disclosure. Key encryption keys ("KEKs") for the three customers n−1, n, and n+1 (202) are concatenated. In some implementations, a concatenation function is used to concatenate a latest version of individual wrapping keys (see below) for each customer.

Returning to FIG. 1, from 102, method 100 proceeds to 104.

Figure 1:
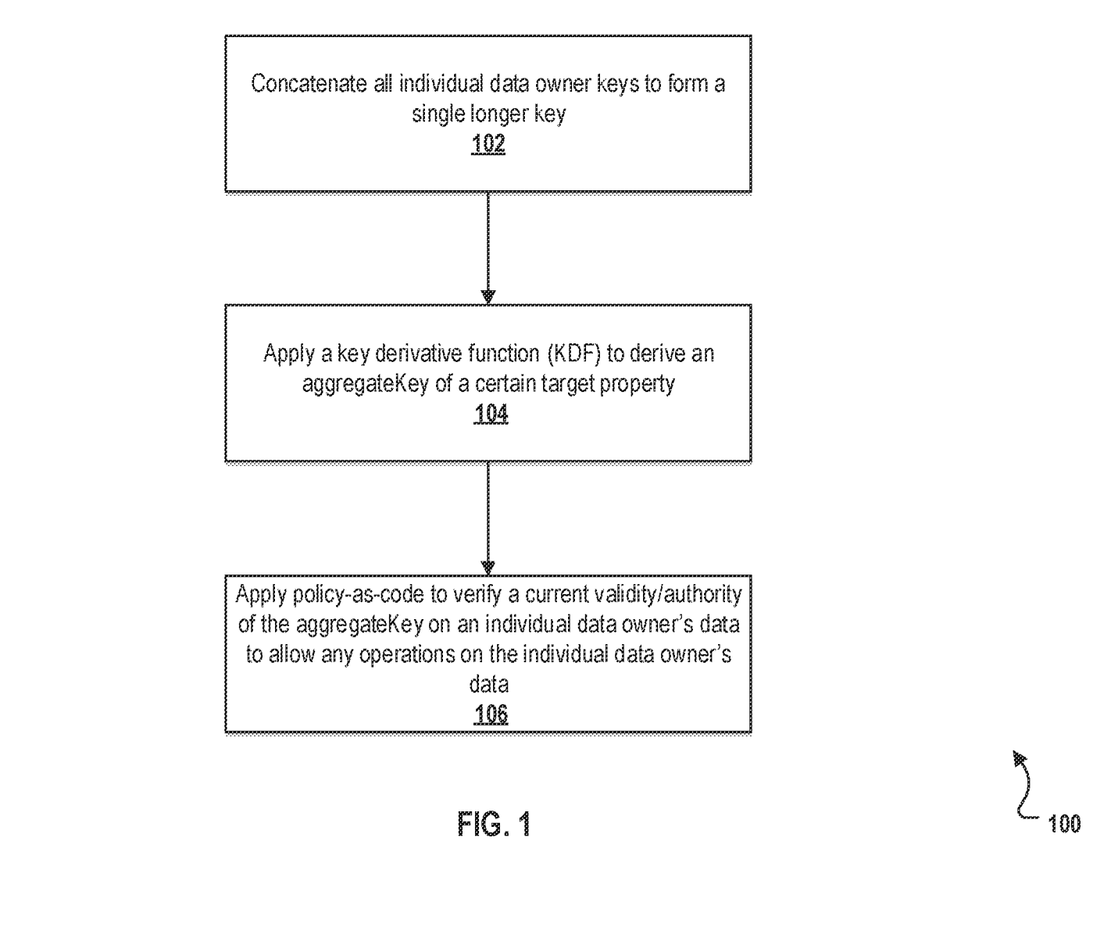
FIG. 1 is a flow chart illustrating an example of a computer-implemented method for encrypting shared data with an aggregate key derived from multiple crypto keychains, according to an implementation of the present disclosure.

At 104, applying, to the concatenated key, a key derivative function (KDF) to derive an aggregateKey ("wrapping key" or "proxyKEK") of a certain target property, which can be decided by the application based on desired entropy and key length. The aggregateKey is usable to encrypt/decrypt each customer's data as long as the individual customer's KEK used to generate the aggregateKey remains valid. The aggregateKey is a unique cryptographic representation of each of the input keychains. Whenever a customer changes (for example, generates/rotates/revokes) their respective wrapping key (that is, each individual data owner's KEK), a new version of the aggregateKey is generated and logged.

For example, turning to FIG. 2, KDF 204 is used to derive the aggregateKey 206. Security properties of the derived aggregateKey 206 are tied to security properties of the used KDF 204 and the entropy of the keys that are being combined. Selection of a key derivative function, as well as target entropy and length of the aggregateKey, remain the Application's prerogative.

In some implementations, pseudocode that described operations associated with 102 and 104 can include:

```
import hashlib
from cryptography.hazmat.primitives.ciphers import Cipher, algorithms, modes
# Build a dictionary: list of keys with validity flags, each belonging to an individual data
owner's keychain. Notice the nesting with aggregateKey_m added as one of the keys.
    keys = [{'key':b'kek_cust_n-1', 'valid':True},
        {'key':b'kek_cust_n', 'valid':True},
        {'key':b'kek_cust_n+1', 'valid':False},
        . . .
        {'key':b'kek_service_m', 'valid':True},
        . . .
        {'key':b'kek_cust_n+2', 'valid':True }]
        {'key':b'kek_service_x', 'valid':True }]
``` time, the service/application using the aggregateKey is not allowed to decrypt that specific data owner's data, but can continue to decrypt data belonging to all other data owners whose keys are still valid.

FIG. 1 is a flow chart illustrating an example of a computer-implemented method 100 for encrypting shared data with an aggregateKey derived from multiple crypto keychains, according to an implementation of the present disclosure. For clarity of presentation, the description that follows generally describes method 100 in the context of the other figures in this description. However, it will be understood that method 100 can be performed, for example, by any system, environment, software, and hardware, or a combination of systems, environments, software, and hardware, as appropriate. In some implementations, various steps of method 100 can be run in parallel, in combination, in loops, or in any order.

At 102, concatenating, as a concatenated key, all individual data owner keys to form a single longer key. The concatenated key inherits properties of its input individual keys, while remaining agnostic to key types and sizes of the input individual keys.

For example, turning to FIG. 2, FIG. 2 is a logic diagram 200 illustrating the computer-implemented method 100 of FIG. 1, according to an implementation of the present

```
#Build a function that takes a new dictionary object,
    appends it to the existing list of keys, concatenates all
    the keys in the list into a single byte object, applies a
    key derivative function (e.g., SHA-256) to the concat-
    enated key, and returns the "aggregateKey_n"
def add_key(new_key: dict):
    keys.append(new_key)
    concatenated_key_n=b"".join([key['key'] for key in
        keys])
    aggregateKey_n=hashlib.sha256(concatenated_key)
        .digest( )
    return aggregateKey_n
```

Returning to FIG. 1, from 104, method 100 proceeds to 106.

At 106, applying policy-as-code to verify a current validity/authority of the aggregateKey on an individual data owner's data to allow any operations on the individual data owner's data. Here, a go/no-go decision gate is applied as an automatic policy. In some implementations, no human intervention is required and/or possible.

For example, turning to FIG. 2, the service "KEK-service-m" 208 shares customer and/or other services data. Using the service, data for customer n−1, n, and n+1 can be encrypted/decrypted as long as their individual KEK's remain valid. For example, if customer n's KEK is indicted as invalid 210, customer n's data will not be accessible using the proxyKEK 206 using the individual customer data encryption key ("DEK").

In some implementations, pseudocode that described operations associated with 106 can include:

```
# Check if the key 'n' is still valid (build an "allow DEK encrypt/decrypt" function that is
suitable to a situation)
    if keys[-1]['valid']:
        aggregateKey_n = add_key({"key": b'n+1th key', "valid":True})
    # Use the aggregateKey_n to encrypt data belonging to the owner of key 'n' (for example,
using AES with CBC just as an example, other algorithms work as well)
        cipher        =        Cipher(algorithms.AES(aggregateKey_n),        modes.CBC,
b'1234567812345678')
        encryptor = cipher.encryptor( )
        ciphertext = encryptor.update(data) + encryptor.finalize( )
    # Use the aggregateKey_n to decrypt the data
        decryptor = cipher.decryptor( )
        plaintext = decryptor.update(ciphertext) + decryptor.finalize( )
    else:
print("The key 'n' is no longer valid.") .
```

Note that at FIG. 2, 214, a customer n+2 is added to the shared data environment that uses a service x 218 which shares customs data/or other service data. This is describing a nesting property, which means that a service using an aggregateKey might be a sub-service to another service requiring its own aggregateKey that includes the previous aggregateKey as one of the inputs. As a result, the proxyKEK 206 is versioned and concatenated with "KEK-cust-n+2" 216. KDF 220 (for example, KDF 204) is used to derive an updated aggregateKey 222 of a certain target property.

The described approach permits effectively unlimited nesting, meaning many multi-customer data-sharing applications/services could derive their respective aggregateKeys out of the previous concatenations of any individual keys and/or any aggregateKeys. A diligent key versioning mechanism is required because the service/application sharing multi-customers' data will typically end up with many versions of the aggregateKey attributed to it (for example, to ensure individualized control on DEKs in each customers' keychain).

An "allow-dek-encrypt/decrypt" function (210, FIG. 2) keeps track of validity of the wrapping keys (meaning whether a wrapping key is currently active/usable or has been revoked) in each customer's keychain. This function acts as a gate and decides whether a specific wrapping key in customer's key chain allows a proxyKEK to encrypt/decrypt subsequent data-encryption-keys for that customer.

Returning to FIG. 1, after 106, method 100 can stop.

Figure 3:
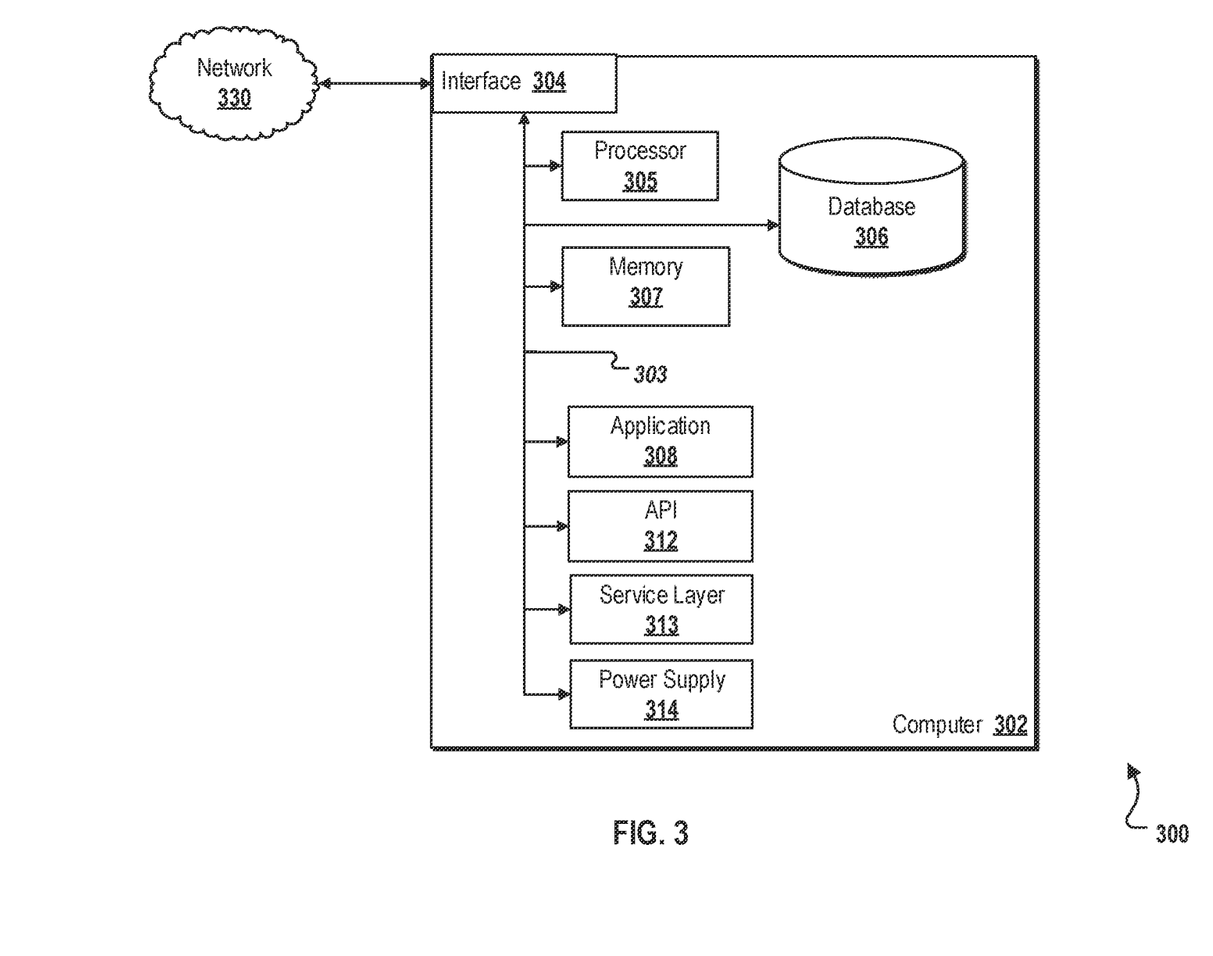
FIG. 3 is a block diagram illustrating an example of a computer-implemented system used to provide computational functionalities associated with described algorithms, methods, functions, processes, flows, and procedures, according to an implementation of the present disclosure.

FIG. 3 is a block diagram illustrating an example of a computer-implemented System 300 used to provide computational functionalities associated with described algorithms, methods, functions, processes, flows, and procedures, according to an implementation of the present disclosure. In the illustrated implementation, System 300 includes a Computer 302 and a Network 330.

The illustrated Computer 302 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 302 can include an input device, such as a keypad, keyboard, or touch screen, or a combination of input devices that can accept user information, and an output device that conveys information associated with the operation of the Computer 302, including digital data, visual, audio, another type of information, or a combination of types of information, on a graphical-type user interface (UI) (or GUI) or other UI.

The Computer 302 can serve in a role in a distributed computing system as, for example, a client, network component, a server, or a database or another persistency, or a combination of roles for performing the subject matter described in the present disclosure. The illustrated Computer 302 is communicably coupled with a Network 330. In some implementations, one or more components of the Computer 302 can be configured to operate within an environment, or a combination of environments, including cloud-computing, local, or global.

At a high level, the Computer 302 is an electronic computing device operable to receive, transmit, process, store, or manage data and information associated with the described subject matter. According to some implementations, the Computer 302 can also include or be communicably coupled with a server, such as an application server, e-mail server, web server, caching server, or streaming data server, or a combination of servers.

The Computer 302 can receive requests over Network 330 (for example, from a client software application executing on another Computer 302) and respond to the received requests by processing the received requests using a software application or a combination of software applications. In addition, requests can also be sent to the Computer 302 from internal users (for example, from a command console or by another internal access method), external or third-parties, or other entities, individuals, systems, or computers.

Each of the components of the Computer 302 can communicate using a System Bus 303. In some implementations, any or all of the components of the Computer 302, including hardware, software, or a combination of hardware and software, can interface over the System Bus 303 using an application programming interface (API) 312, a Service Layer 313, or a combination of the API 312 and Service Layer 313. The API 312 can include specifications for routines, data structures, and object classes. The API 312 can be either computer-language independent or dependent and refer to a complete interface, a single function, or even a set of APIs. The Service Layer 313 provides software services to the Computer 302 or other components (whether illustrated or not) that are communicably coupled to the Computer 302. The functionality of the Computer 302 can be accessible for all service consumers using the Service Layer 313. Software services, such as those provided by the Service Layer 313, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 302, alternative implementations can illustrate the API 312 or the Service Layer 313 as stand-alone components in relation to other components of the Computer 302 or other components (whether illustrated or not) that are communicably coupled to the Computer 302. Moreover, any or all parts of the API 312 or the Service Layer 313 can be implemented as a child or a sub-module of another software module, enterprise application, or hardware module without departing from the scope of the present disclosure.

The Computer 302 includes an Interface 304. Although illustrated as a single Interface 304, two or more Interfaces 304 can be used according to particular needs, desires, or particular implementations of the Computer 302. The Interface 304 is used by the Computer 302 for communicating with another computing system (whether illustrated or not) that is communicatively linked to the Network 330 in a distributed environment. Generally, the Interface 304 is operable to communicate with the Network 330 and includes logic encoded in software, hardware, or a combination of software and hardware. More specifically, the Interface 304 can include software supporting one or more communication protocols associated with communications such that the Network 330 or hardware of Interface 304 is operable to communicate physical signals within and outside of the illustrated Computer 302.

The Computer 302 includes a Processor 305. Although illustrated as a single Processor 305, two or more Processors 305 can be used according to particular needs, desires, or particular implementations of the Computer 302. Generally, the Processor 305 executes instructions and manipulates data to perform the operations of the Computer 302 and any algorithms, methods, functions, processes, flows, and procedures as described in the present disclosure.

The Computer 302 also includes a Database 306 that can hold data for the Computer 302, another component communicatively linked to the Network 330 (whether illustrated or not), or a combination of the Computer 302 and another component. For example, Database 306 can be an in-memory or conventional database storing data consistent with the present disclosure. In some implementations, Database 306 can be a combination of two or more different database types (for example, a hybrid in-memory and conventional database) according to particular needs, desires, or particular implementations of the Computer 302 and the described functionality. Although illustrated as a single Database 306, two or more databases of similar or differing types can be used according to particular needs, desires, or particular implementations of the Computer 302 and the described functionality. While Database 306 is illustrated as an integral component of the Computer 302, in alternative implementations, Database 306 can be external to the Computer 302. The Database 306 can hold and operate on at least any data type mentioned or any data type consistent with this disclosure.

The Computer 302 also includes a Memory 307 that can hold data for the Computer 302, another component or components communicatively linked to the Network 330 (whether illustrated or not), or a combination of the Computer 302 and another component. Memory 307 can store any data consistent with the present disclosure. In some implementations, Memory 307 can be a combination of two or more different types of memory (for example, a combination of semiconductor and magnetic storage) according to particular needs, desires, or particular implementations of the Computer 302 and the described functionality. Although illustrated as a single Memory 307, two or more Memories 307 or similar or differing types can be used according to particular needs, desires, or particular implementations of the Computer 302 and the described functionality. While Memory 307 is illustrated as an integral component of the Computer 302, in alternative implementations, Memory 307 can be external to the Computer 302.

The Application 308 is an algorithmic software engine providing functionality according to particular needs, desires, or particular implementations of the Computer 302, particularly with respect to functionality described in the present disclosure. For example, Application 308 can serve as one or more components, modules, or applications. Further, although illustrated as a single Application 308, the Application 308 can be implemented as multiple Applications 308 on the Computer 302. In addition, although illustrated as integral to the Computer 302, in alternative implementations, the Application 308 can be external to the Computer 302.

The Computer 302 can also include a Power Supply 314. The Power Supply 314 can include a rechargeable or non-rechargeable battery that can be configured to be either user- or non-user-replaceable. In some implementations, the Power Supply 314 can include power-conversion or management circuits (including recharging, standby, or another power management functionality). In some implementations, the Power Supply 314 can include a power plug to allow the Computer 302 to be plugged into a wall socket or another power source to, for example, power the Computer 302 or recharge a rechargeable battery.

There can be any number of Computers 302 associated with, or external to, a computer system containing Computer 302, each Computer 302 communicating over Network 330. Further, the term "client," "user," or other appropriate terminology can be used interchangeably, as appropriate, without departing from the scope of the present disclosure. Moreover, the present disclosure contemplates that many users can use one Computer 302, or that one user can use multiple computers 302.

Described implementations of the subject matter can include one or more features, alone or in combination.

For example, in a first implementation, a computer-implemented method, comprising: concatenating, as a concatenated key, all individual data owner key encryption keys (KEKs) to form a single longer key; applying, to the concatenated key, a key derivative function (KDF) to derive an aggregateKey of a certain target property; and applying policy-as-code to verify a current validity/authority of the aggregateKey on data of an individual data owner to allow any operations on the data of an individual data owner.

The foregoing and other described implementations can each, optionally, include one or more of the following features:

A first feature, combinable with any of the following features, wherein the concatenated key inherits properties of its input individual keys, while remaining agnostic to key types and sizes of input individual keys.

A second feature, combinable with any of the previous or following features, comprising generating and logging a new version of the aggregateKey whenever an individual data owner changes their associated KEK.

A third feature, combinable with any of the previous or following features, wherein security properties of the aggregateKey are tied to properties of the KDF and entropy of all individual data owner KEKs.

A fourth feature, combinable with any of the previous or following features, wherein the certain target property is decided by an application based on a desired entropy and key length.

A fifth feature, combinable with any of the previous or following features, wherein, as long as an individual data owner's KEK remains valid, the aggregateKey is usable to encrypt/decrypt each individual data owner's data using each individual data owner's data encryption key (DEK).

A sixth feature, combinable with any of the previous or following features, wherein an aggregateKey can be concatenated with a KEK or other aggregateKey to form another aggregateKey.

In a second implementation, a non-transitory, computer-readable medium storing one or more instructions executable by a computer system to perform operations comprising: concatenating, as a concatenated key, all individual data owner key encryption keys (KEKs) to form a single longer key; applying, to the concatenated key, a key derivative function (KDF) to derive an aggregateKey of a certain target property; and applying policy-as-code to verify a current validity/authority of the aggregateKey on data of an individual data owner to allow any operations on the data of an individual data owner.

The foregoing and other described implementations can each, optionally, include one or more of the following features:

A first feature, combinable with any of the following features, wherein the concatenated key inherits properties of its input individual keys, while remaining agnostic to key types and sizes of input individual keys.

A second feature, combinable with any of the previous or following features, comprising generating and logging a new version of the aggregateKey whenever an individual data owner changes their associated KEK.

A third feature, combinable with any of the previous or following features, wherein security properties of the aggregateKey are tied to properties of the KDF and entropy of all individual data owner KEKs.

A fourth feature, combinable with any of the previous or following features, wherein the certain target property is decided by an application based on a desired entropy and key length.

A fifth feature, combinable with any of the previous or following features, wherein, as long as an individual data owner's KEK remains valid, the aggregateKey is usable to encrypt/decrypt each individual data owner's data using each individual data owner's data encryption key (DEK).

A sixth feature, combinable with any of the previous or following features, wherein an aggregateKey can be concatenated with a KEK or other aggregateKey to form another aggregateKey.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: concatenating, as a concatenated key, all individual data owner key encryption keys (KEKs) to form a single longer key; applying, to the concatenated key, a key derivative function (KDF) to derive an aggregateKey of a certain target property; and applying policy-as-code to verify a current validity/authority of the aggregateKey on data of an individual data owner to allow any operations on the data of an individual data owner.

The foregoing and other described implementations can each, optionally, include one or more of the following features:

A first feature, combinable with any of the following features, wherein the concatenated key inherits properties of its input individual keys, while remaining agnostic to key types and sizes of input individual keys.

A second feature, combinable with any of the previous or following features, comprising generating and logging a new version of the aggregateKey whenever an individual data owner changes their associated KEK.

A third feature, combinable with any of the previous or following features, wherein security properties of the aggregateKey are tied to properties of the KDF and entropy of all individual data owner KEKs.

A fourth feature, combinable with any of the previous or following features, wherein the certain target property is decided by an application based on a desired entropy and key length.

A fifth feature, combinable with any of the previous or following features, wherein, as long as an individual data owner's KEK remains valid, the aggregateKey is usable to encrypt/decrypt each individual data owner's data using each individual data owner's data encryption key (DEK).

A sixth feature, combinable with any of the previous or following features, wherein an aggregateKey can be concatenated with a KEK or other aggregateKey to form another aggregateKey.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, multiple processors or computers, or quantum computing technologies. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services/cloud microservices, function-as-code, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing.

Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   concatenating, as a concatenated key, all individual data owner key encryption keys (KEKs) to form a single longer key;
   applying, to the concatenated key, a key derivative function (KDF) to derive an aggregateKey of a certain target property; and
   applying policy-as-code to verify a current validity/authority of the aggregateKey on data of an individual data owner to allow any operations on the data of an individual data owner, wherein, as long as an individual data owner's KEK remains valid, the aggregateKey is usable to encrypt/decrypt each individual data owner's data using each individual data owner's data encryption key (DEK) while another individual data owner's invalid KEK renders the aggregateKey unusable to encrypt/decrypt the another individual data owner's data using the another individual data owner's DEK.

2. The computer-implemented method of claim 1, wherein the concatenated key inherits properties of its input individual keys, while remaining agnostic to key types and sizes of input individual keys.

3. The computer-implemented method of claim 1, comprising generating and logging a new version of the aggregateKey whenever an individual data owner changes their associated KEK.

4. The computer-implemented method of claim 1, wherein security properties of the aggregateKey are tied to properties of the KDF and entropy of all individual data owner KEKs.

5. The computer-implemented method of claim 1, wherein the certain target property is decided by an application based on a desired entropy and key length.

6. The computer-implemented method of claim 1, wherein an aggregateKey can be concatenated with a KEK or other aggregateKey to form another aggregateKey.

7. The computer-implemented method of claim 1, wherein the individual data owner KEKs are crypto keychains.

8. A non-transitory, computer-readable medium storing one or more instructions executable by a computer system to perform operations comprising:
concatenating, as a concatenated key, all individual data owner key encryption keys (KEKs) to form a single longer key;
applying, to the concatenated key, a key derivative function (KDF) to derive an aggregateKey of a certain target property; and
applying policy-as-code to verify a current validity/authority of the aggregateKey on data of an individual data owner to allow any operations on the data of an individual data owner, wherein, as long as an individual data owner's KEK remains valid, the aggregateKey is usable to encrypt/decrypt each individual data owner's data using each individual data owner's data encryption key (DEK) while another individual data owner's invalid KEK renders the aggregateKey unusable to encrypt/decrypt the another individual data owner's data using the another individual data owner's DEK.

9. The non-transitory, computer-readable medium of claim 8, wherein the concatenated key inherits properties of its input individual keys, while remaining agnostic to key types and sizes of input individual keys.

10. The non-transitory, computer-readable medium of claim 8, comprising generating and logging a new version of the aggregateKey whenever an individual data owner changes their associated KEK.

11. The non-transitory, computer-readable medium of claim 8, wherein security properties of the aggregateKey are tied to properties of the KDF and entropy of all individual data owner KEKs.

12. The non-transitory, computer-readable medium of claim 8, wherein the certain target property is decided by an application based on a desired entropy and key length.

13. The non-transitory, computer-readable medium of claim 8, wherein an aggregateKey can be concatenated with a KEK or other aggregateKey to form another aggregateKey.

14. The non-transitory, computer-readable medium of claim 8, wherein the individual data owner KEKs are crypto keychains.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
concatenating, as a concatenated key, all individual data owner key encryption keys (KEKs) to form a single longer key;
applying, to the concatenated key, a key derivative function (KDF) to derive an aggregateKey of a certain target property; and
applying policy-as-code to verify a current validity/authority of the aggregateKey on data of an individual data owner to allow any operations on the data of an individual data owner, wherein, as long as an individual data owner's KEK remains valid, the aggregateKey is usable to encrypt/decrypt each individual data owner's data using each individual data owner's data encryption key (DEK) while another individual data owner's invalid KEK renders the aggregateKey unusable to encrypt/decrypt the another individual data owner's data using the another individual data owner's DEK.

16. The computer-implemented system of claim 15, wherein the concatenated key inherits properties of its input individual keys, while remaining agnostic to key types and sizes of input individual keys.

17. The computer-implemented system of claim 15, comprising generating and logging a new version of the aggregateKey whenever an individual data owner changes their associated KEK.

18. The computer-implemented system of claim 15, wherein security properties of the aggregateKey are tied to properties of the KDF and entropy of all individual data owner KEKs.

19. The computer-implemented system of claim 15, wherein the certain target property is decided by an application based on a desired entropy and key length.

20. The computer-implemented system of claim 15, wherein the individual data owner KEKs are crypto keychains.

* * * * *